(12) United States Patent
Mabbett et al.

(10) Patent No.: US 10,450,160 B2
(45) Date of Patent: Oct. 22, 2019

(54) GRATING INSERT FOR RIGGING ROPE

(71) Applicants: Paul Michael Mabbett, Sherwood Park (CA); Timothy Grant Griffith, Edmonton (CA)

(72) Inventors: Paul Michael Mabbett, Sherwood Park (CA); Timothy Grant Griffith, Edmonton (CA)

(*) Notice: Subject to any disclaimer, the term of this patent is extended or adjusted under 35 U.S.C. 154(b) by 22 days.

(21) Appl. No.: 15/646,422

(22) Filed: Jul. 11, 2017

(65) Prior Publication Data
US 2018/0009627 A1 Jan. 11, 2018

Related U.S. Application Data

(60) Provisional application No. 62/360,886, filed on Jul. 11, 2016.

(51) Int. Cl.
*B65H 57/04* (2006.01)
*F16L 5/00* (2006.01)
*B63B 21/04* (2006.01)

(52) U.S. Cl.
CPC ............ *B65H 57/04* (2013.01); *B63B 21/04* (2013.01); *F16L 5/00* (2013.01); *B65H 2701/35* (2013.01); *Y10T 29/49828* (2015.01)

(58) Field of Classification Search
CPC ....... F16L 5/00; B65H 57/04; B65H 2701/35; B63B 21/04; Y10T 29/49828
USPC .................... 248/56; 254/390, 371; 425/464; 403/211; 24/134 R, 136 R, 136 L, 24/132 WL; 187/254; 114/90; 40/617; 182/45
See application file for complete search history.

(56) References Cited

U.S. PATENT DOCUMENTS

| 4,388,680 A * | 6/1983 | Moore ................... F21S 8/086 362/145 |
| 4,445,395 A | 5/1984 | Beckman et al. |
| 6,526,626 B1 * | 3/2003 | LoTufo ................... A47F 7/163 16/110.1 |
| 6,719,243 B1 | 4/2004 | Haverty |
| 7,922,128 B2 * | 4/2011 | Young, IV ............... F16L 5/00 248/49 |
| 8,500,072 B2 * | 8/2013 | Ayme ....................... H02G 3/22 174/153 G |
| 2003/0131443 A1 * | 7/2003 | Trent ................... B60R 13/0846 16/2.1 |
| 2009/0101762 A1 * | 4/2009 | Young, IV ............. F16L 3/223 248/56 |
| 2010/0257836 A1 * | 10/2010 | Shnayder ................ B63B 21/04 59/93 |

FOREIGN PATENT DOCUMENTS

| AU | 2014101410 | 2/2015 |
| EP | 01500235.5 | 3/2002 |
| EP | 3333997 A1 * | 6/2018 ............. F16L 3/137 |

OTHER PUBLICATIONS

DMM Edgehog Instructions.
Mac-Pro Website, "The Simple, Robust Rope Protection Device You Can Trust", http://mac-pro.com.au/#home, Feb. 10, 2017.

* cited by examiner

*Primary Examiner* — Bayan Salone
(74) *Attorney, Agent, or Firm* — James A. Sheridan; Sheridan Law, LLC

(57) ABSTRACT

An insert is provided for use on industry standard gratings to prevent wear and damage to rigging ropes passing through the insert.

14 Claims, 6 Drawing Sheets

GRATING INSERT FOR RIGGING ROPE

CROSS-REFERENCE TO RELATED APPLICATIONS

This application claims priority of U.S. provisional patent application Ser. No. 62/360,886 filed Jul. 11, 2016, which is incorporated by reference into this application in its entirety.

TECHNICAL FIELD

The present disclosure is related to the field of rope guides for use on grating systems, in particular, rope guides configured to protect individual ropes passing through industry standard Kennedy™ grating systems that can be used for industrial rope access, commercial rope access, offshore oil & gas facilities (i.e.: platforms, drilling rigs, semi-submersible, jack-ups, floating production storage and offloading vessels ("FPSO's"), gravity base structures, emergency response teams/persons (i.e.: high angle rescue teams), power plants, pulp and paper mills, mining, refineries and telecommunications towers and facilities, among others.

BACKGROUND

Industrial structures can have grating systems mounted thereon to provide platforms positioned at various elevations, and stair structures to provide access between the platforms. Referring to FIG. 1, a prior art grating G is shown, that can comprise a plurality of parallel spaced-apart load bar members L welded or otherwise attached or affixed to a plurality of parallel spaced-apart cross-bar members C, wherein cross-bar members C are orthogonal to load bar members L. Adjacent load bar members L can be spaced apart by distance A, and adjacent cross-bar members C can be spaced apart by distance B, where A can be 24 mm and B can be 94 mm, although other distances for A and B can be used, as well known to those skilled in the art.

When working on structures having grating platforms and the like, it is often required to run rigging ropes through the grating to support or suspend personnel, materials or both. In so doing, the rigging ropes will contact and rub against the load bar members and cross-bar members that make up the grating. This gives rise to the possibility that the grating members can cut or fray the rigging ropes and, thus, cause the rigging rope to break or fail resulting in the personnel falling or becoming injured.

The unwritten or unofficial industry standard for rope protection, in many cases, has been, first, a "make-shift" type protective enclosure created from that whatever is available on the work site to reduce the impact of the "hard edge" of the grating to the rope(s). The second is having to double or even triple-up the fabric type rope protectors around the rope that is stuffed into an area or opening in the grating, as an example. This results in a "what if" factor as to whether the piece of rope protection last stay in place for the entire time the personnel is working suspended from the rigging rope.

To counter this problem, it is known to use an insert device for use on the grating where the rope is passed through the device to prevent the cutting or fraying of the rope. Such known insert devices used for guiding rope through grating systems are, typically, limited to a single rope, are made of metal and are relatively heavy to carry by personnel in setting up a rigging rope through grating, can require tools to install on grating and are relatively expensive.

It is, therefore, desirable to provide a grating insert for rigging rope that overcomes the shortcomings of the known devices used for this purpose.

SUMMARY

An insert for use on a grating to allow rigging rope to pass the grating without snagging, or being cut by, the grating is provided.

It is one objective to give the personnel, operatives and technicians out in the field the comfort in knowing that the rope protection they have put in place for the ropes in the form of an improved grating insert is, in fact, going to prevent damage to the rope.

It is another objective to provide a grating insert that can give a smooth surface to raise and lower a weighted line without causing the rope protector to move or wear from contact with a hard edge of the grating.

It is another objective to provide a grating insert that can be easily set into a grating without any tools.

In some embodiments, a grating insert can comprise two or more elongated rope guides for rigging ropes to pass through. In some embodiments, this can give personnel, operatives and technicians the ability to separate two or more independent ropes, thus, preventing friction between the individual ropes. In some embodiments, the elongated rope guides of the grating insert can comprise smooth rounded edges to allow ropes to easily pass through.

The grating insert described herein was designed, tested and manufactured in western Canada. The design arose out of the need for a safe, effective and easy method to suspend ropes through Kennedy grating. The conventional method was a result of time and time again having to use of using the traditional, coated fabric rope protectors that all the well-known manufacturing leaders in the rope access industry offer. This approach is problematic as these fabric pieces of rope protectors do not last the test of time and abuse. Because the rope access industry is continually evolving, and the operatives/technicians are playing a bigger role of designing and testing, more practical pieces of kit that aid in the safety when working from ropes are being developed.

In some embodiments, the grating insert can be made from an engineered resin called Super Tough Nylon. It has many different applications ranging from electronic, marine and the automotive industries.

In some embodiments, the grating insert can provide protection against sharp, hard edges along industry standard grating. Rope wear can become a failure and or catastrophic in some cases if not protected. In some embodiments, the grating insert can provide a smooth uniform edge for the rope(s) to pass through the grating enabling the technicians to place the rope in the specific work area very specific areas below.

Broadly stated, in some embodiments, an insert can be provided for guiding rigging ropes through a grating comprising spaced-apart cross-bar members operatively coupled to spaced-apart load bar members of a predetermined height, the insert comprising: a base member comprising a top surface; and at least one rope guide extending downwardly from the top surface a distance greater than the predetermined height.

Broadly stated, in some embodiments, a method can be provided for rigging a rope through a grating comprising spaced-apart cross-bar members operatively coupled to spaced-apart load bar members of a predetermined height, the method comprising the steps of: providing an insert for use on the grating, the insert comprising: a base member comprising a top surface, and at least one rope guide extending downwardly from the top surface a distance greater than the predetermined height; placing the at least one rope guide between a pair of the spaced-apart load bar members; and passing at least one rigging rope through the at least one rope guide.

Broadly stated, in some embodiments, the base member can further comprise a perimeter further comprising at least one rounded shoulder.

Broadly stated, in some embodiments, the at least one rope guide can further comprise a rounded inlet.

Broadly stated, in some embodiments, the at least one rope guide can further comprise an elongated configuration.

Broadly stated, in some embodiments, the at least one rope guide can comprise a width that corresponds to a space between adjacent load-bar members.

Broadly stated, in some embodiments, the width of the at least one rope guide can be selected such that at least some force is required to insert the at least one rope guide between adjacent load-bar members.

Broadly stated, in some embodiments, the insert can further comprise at least two rope guides.

Broadly stated, in some embodiments, the insert can be comprised of nylon.

Broadly stated, in some embodiments, the nylon can comprise an additive to protect the insert from ultraviolet light.

DETAILED DESCRIPTION OF EMBODIMENTS

A grating insert to be used on the industry standard sized grating is provided. In some embodiments, the grating insert can be installed on an industry grating with little or no effort from the operative/technician.

Figure 1:
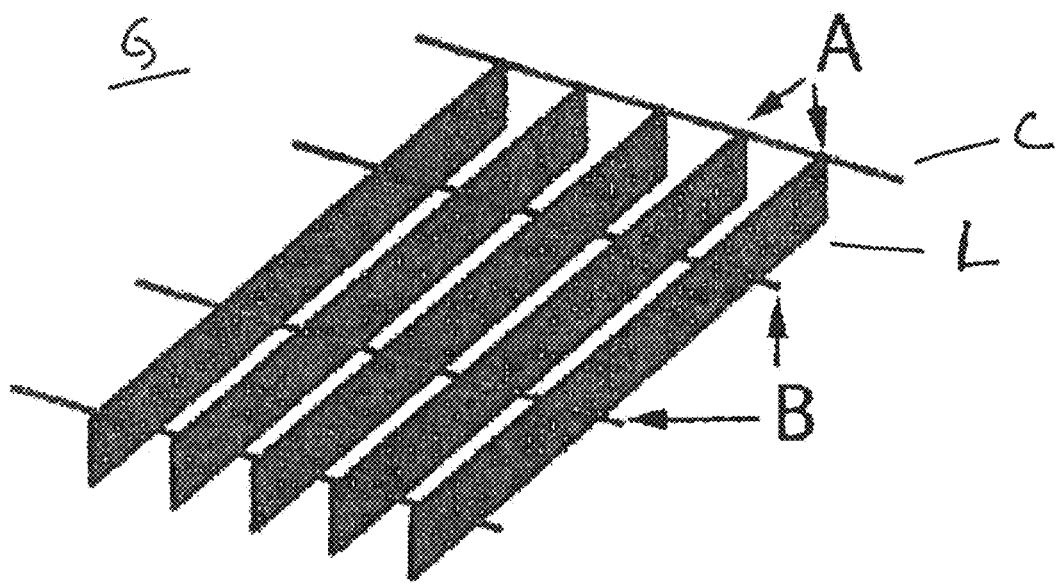
FIG. 1 is a perspective view depicting a prior art grating having load bar members and cross-bar members.
Figure 2:
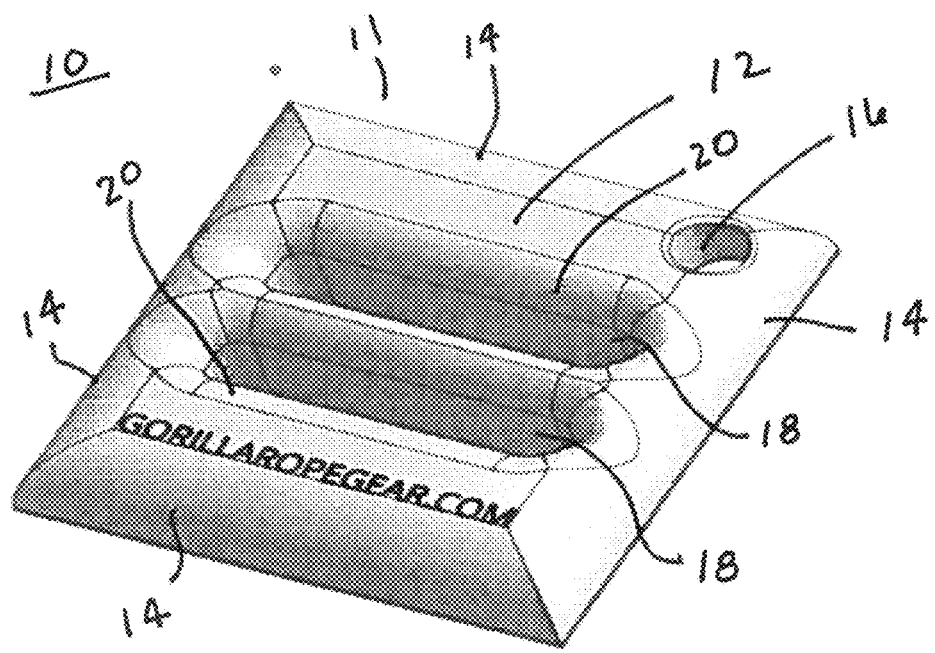
FIG. 2 is a perspective view depicting one embodiment of a grating insert that can be used with the grating of FIG. 1.
Figure 3:
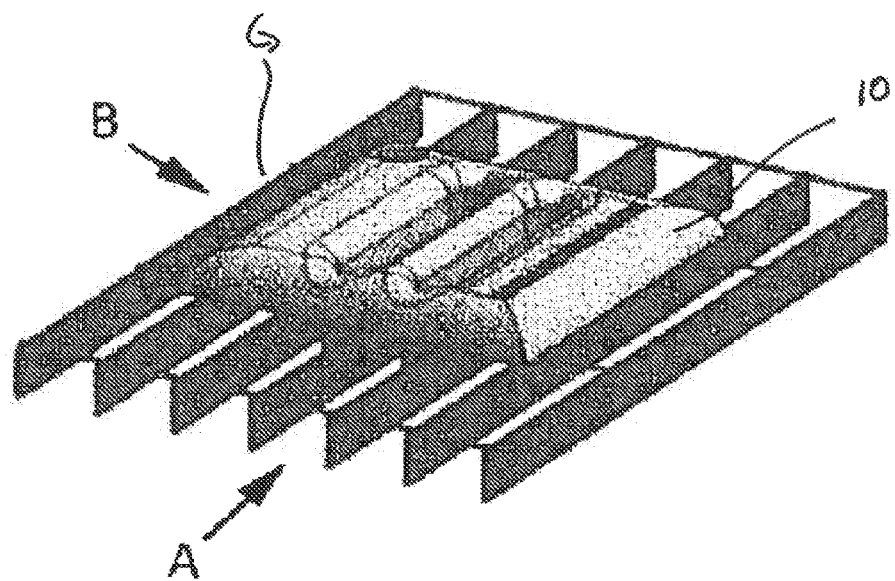
FIG. 3 is a perspective view depicting the grating insert of FIG. 2 installed on the grating of FIG. 1.
Figure 4:
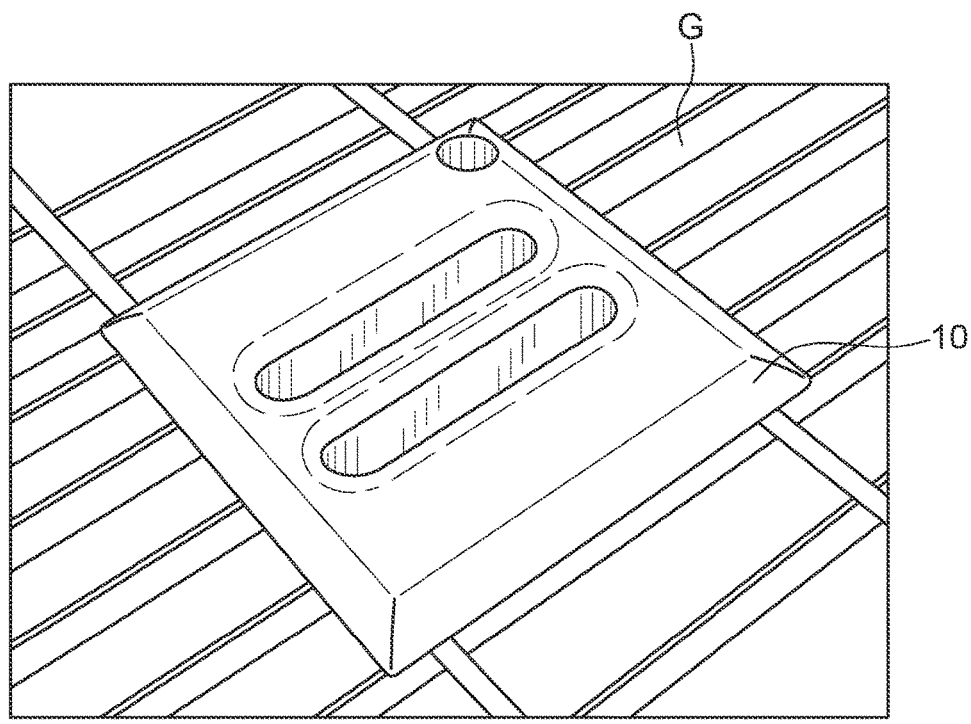
FIG. 4 is a top perspective view depicting the grating insert and grating of FIG. 3.

Referring to FIG. 2, one embodiment of grating insert 10 is shown. In some embodiments, insert 10 can comprise top surface 12 further comprising rounded shoulders 14 disposed at least partially around the perimeter of insert 10 to prevent any snagging with a rigging rope. In some embodiments, insert 10 can comprise tote hole 16 to provide means for toting or carrying insert 10. Tote hole 16 can be configured to be placed on a carabiner clip (not shown) to hang from a technician's belt or safety straps while they ascend or descend in a grating structure. In some embodiments, insert 10 can comprise one or more elongated rope slots 18 to form rope guides extending downwardly from top surface 12 of base member 11. In the illustrated embodiment, insert 10 is shown with two rope slots 18. Slots 18 can further comprise rounded inlets 20, having a similar rounded profile to shoulders 14, to reduce friction and snagging with a rigging rope placed through the slots. Referring to FIGS. 3 and 4, one embodiment of insert 10 is shown installed on grating G.

Figure 5:
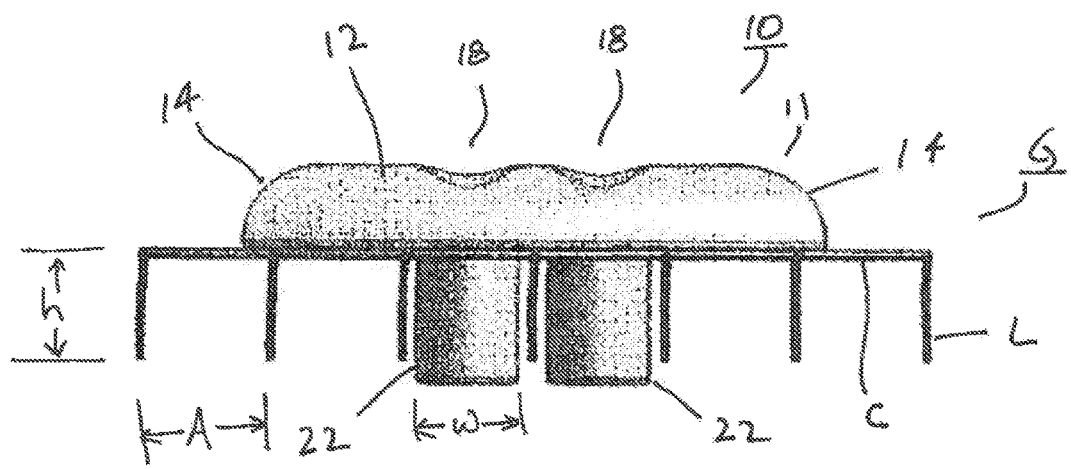
FIG. 5 is a front elevation view depicting the grating insert and grating of FIG. 3.
Figure 6:
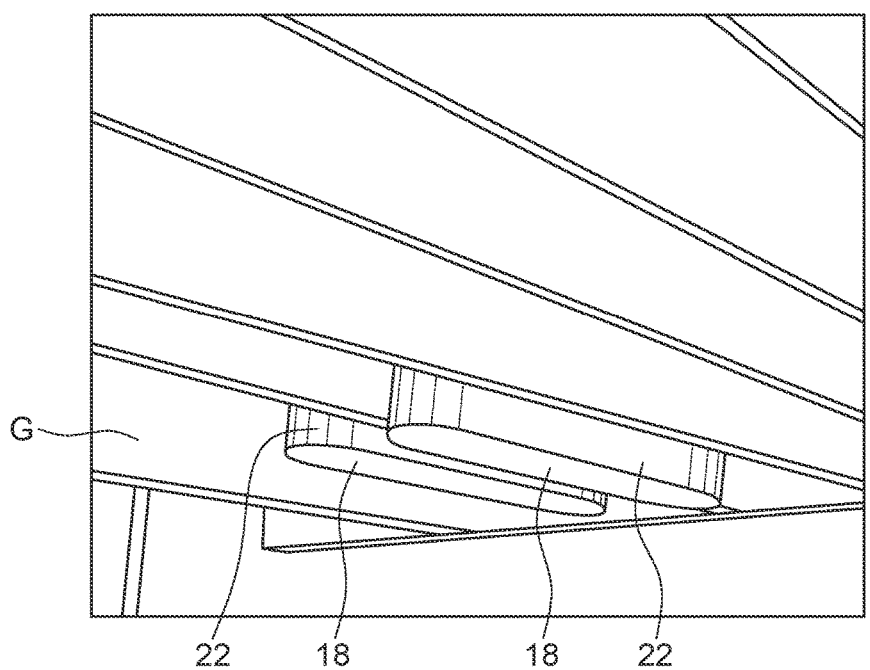
FIG. 6 is a bottom perspective view depicting the grating insert and grating of FIG. 4.
Figure 7:
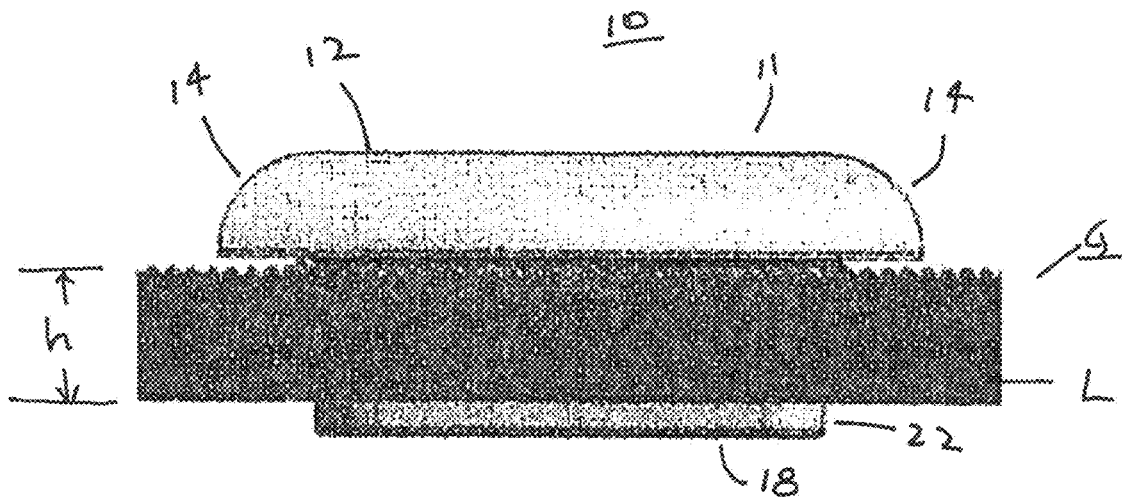
FIG. 7 is a side elevation view depicting the grating insert and grating of FIG. 3.

Referring to FIGS. 5 to 7, insert 10 is shown comprising rope guide tubes 22 extending downwardly from top surface 12 in between load bars L of grating G. In some embodiments, the length of rope guide tubes 22 can be selected to be longer than the height, "h", of load bars L such that the bottom edges of rope guide tubes 22 extends below the bottom edge of load bars L, as shown in FIGS. 5 to 7. In some embodiments, width "w" of rope guide tubes 22 can be wide enough to pass between load bars L having spacing A therebetween so that there is at least some resistance to install rope guide tubes 22 between load bars L so as to keep insert 10 in place in grating G when ropes are run through rope guide tubes 22, and to prevent insert 10 from lifting easily or accidentally off of grating G when in use.

It is very important to clear away any debris from the chosen area of grating G the operative/technician chooses to place insert 10 in order to get good contact with the top of grating G. If grating G is not bent or obstructed, insert 10 can then be placed as described above, preferably in openings in grating G that are free from any type of debris or blockage.

In some embodiments, insert 10 can comprise two elongated rope guide tubes 22 that can be designed to fit into the elongated openings of standard sized grating. By comprising two rope guide tubes 22 that can be placed in adjacent openings of grating G separated by a load bar member L, insert 10 can be prevented from moving around or twisting on grating G. In addition, insert 10 having more than one rope slot 18 can prevent having to use more than one rope in a single rope slot 18 and, thus, prevent "rope on rope" friction.

Figure 8:
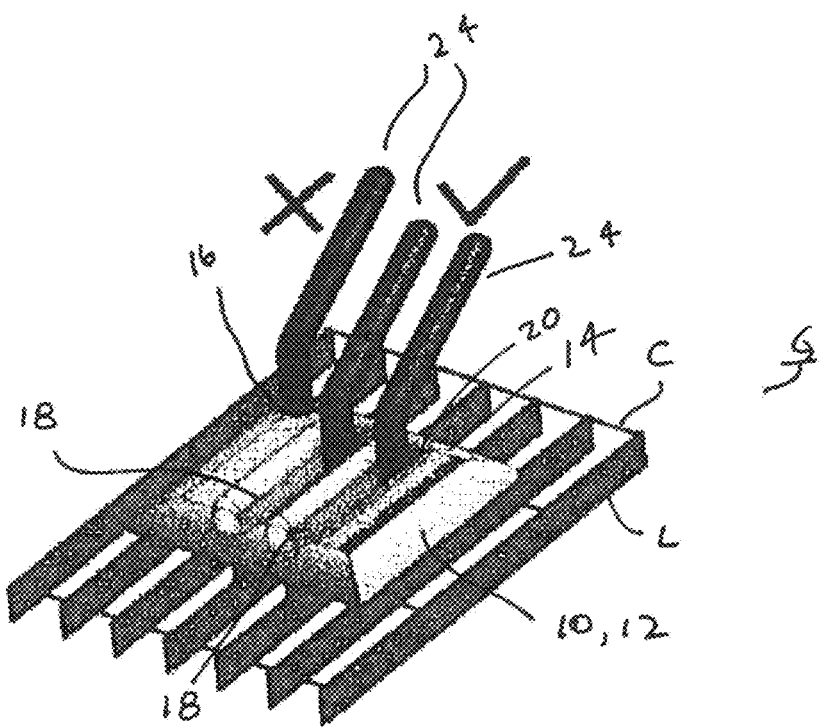
FIG. 8 is a perspective view depicting the grating insert and grating of FIG. 3 having rigging ropes passing through the rope guides of the grating insert, the ropes deflected along the axes of the rope guides.
Figure 9:
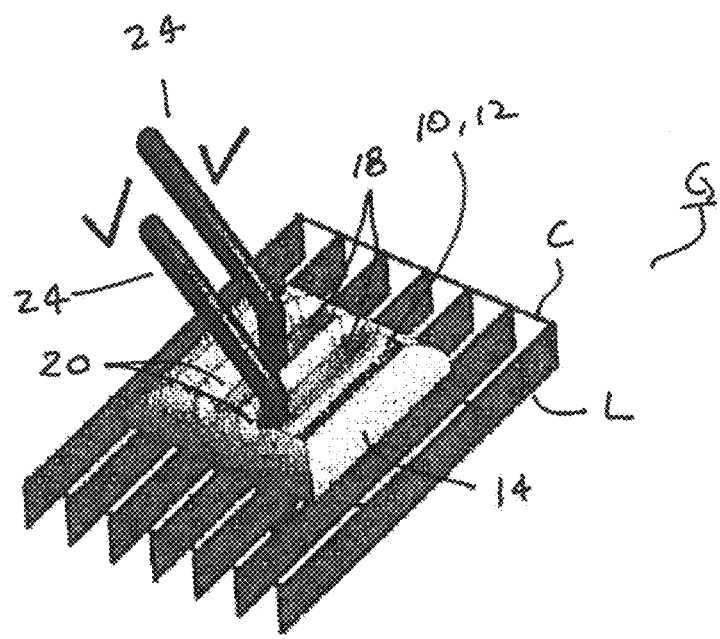
FIG. 9 is a perspective view depicting the grating insert and grating of FIG. 3 having rigging ropes passing through the rope guides of the grating insert, the ropes deflected orthogonally to the axes of the rope guides.

Referring to FIGS. 8 and 9, a rope 24 is shown in each of rope slots 18. Ropes 24 can not only pass straight through rope slots 18 vertically, but can also be deflected from the vertical in any azimuth angle about rope slot 18, and can be further deflected either above or below insert 10. In FIG. 8, ropes 24 are shown deflected along an axis that is parallel to the longitudinal axes of elongated rope slots 18, wherein ropes 24 can contact along rounded shoulders 20. In FIG. 8, there is a rope 24 shown through tote hole 16, which is an illustration of where a rope 24 is not to be placed through as tote hole 16 is not large enough to provide friction-free movement therethrough for rope 24; tote hole 16 is intended as a means for carrying insert 10. In FIG. 9, ropes 24 are shown deflected along an axis that is orthogonal to the longitudinal axes of elongated rope slots 18, wherein ropes 24 can contact along rounded shoulders 20.

Figure 10:
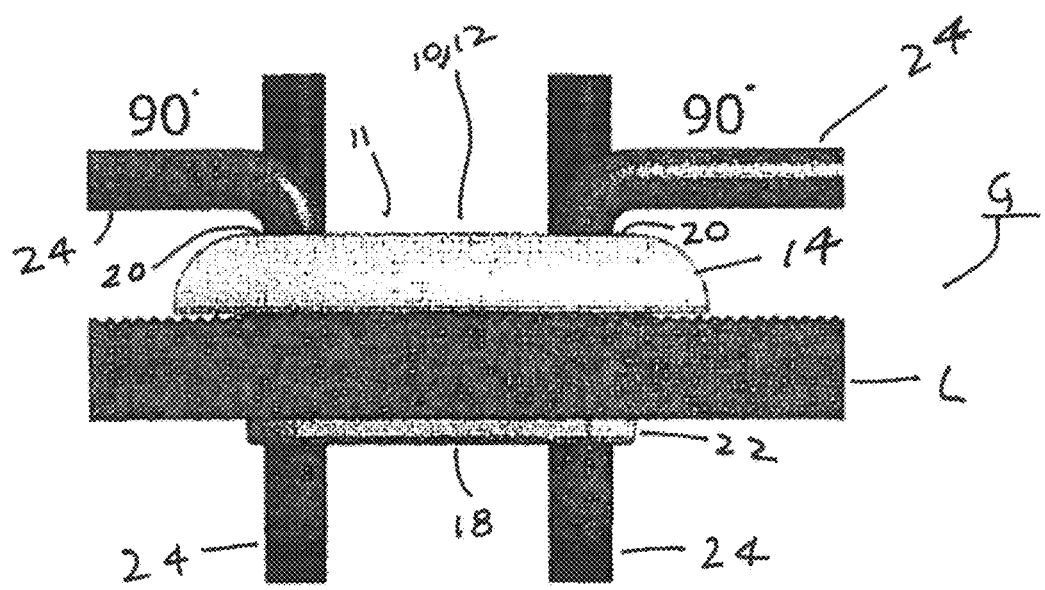
FIG. 10 is a side elevation view depicting the grating insert and grating of FIG. 7 having rigging ropes passing through the rope guides of the grating insert, the ropes deflected 90° above the grating insert.
Figure 11:
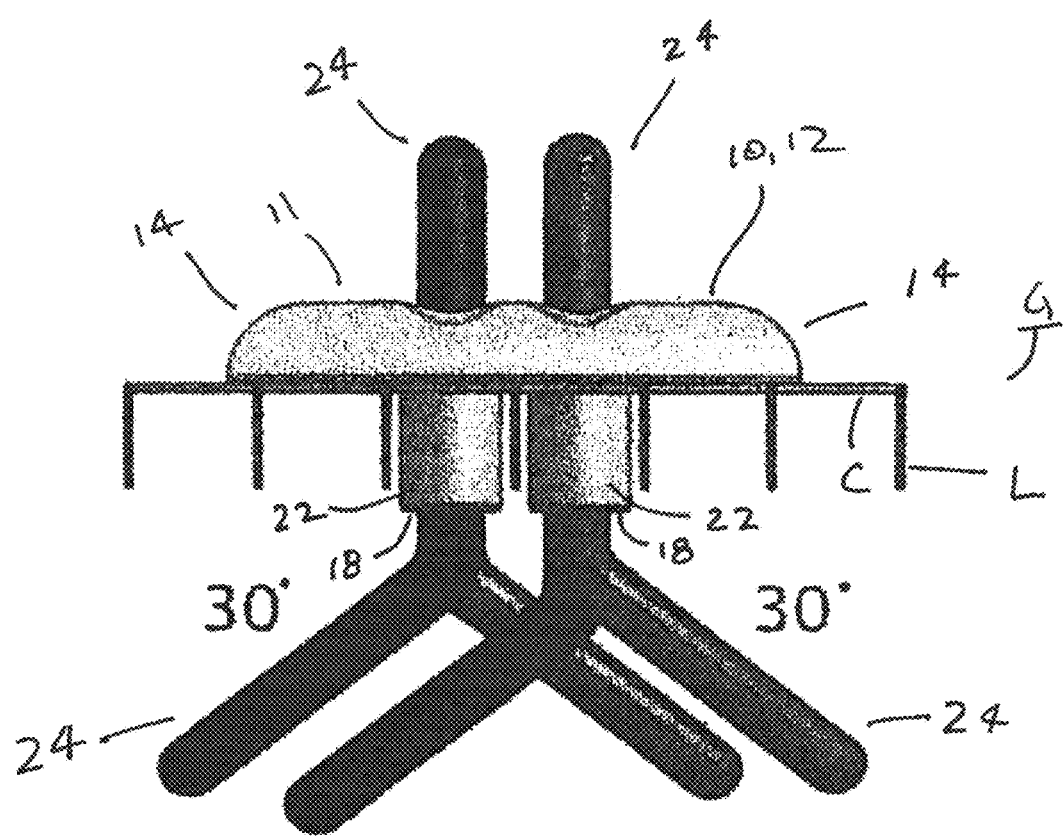
FIG. 11 is a front elevation view depicting the grating insert and grating of FIG. 5 having rigging ropes passing through the rope guides of the grating insert, the ropes deflected 30° from the horizontal below the grating insert.

Referring to FIG. 10, ropes 24 are shown deflected 90° from vertical above top surface 24, wherein ropes 24 can contact along rounded shoulders 20. Referring to FIG. 11, ropes 24 are shown deflected 30° from horizontal below insert 10.

In some embodiments, insert 10 can be made of Super Tough Nylon (STN) with a ultraviolet ("UV") light protection additive to the resin when formed at the manufacturing stage. STN has a deflection temperature rating of 270° F., and a melting temperature at approximately 505 F°.

In some embodiments, the UV light protection additive can comprise one or more of UV Absorbers, Quenchers and Hindered Amine Light Stabilizers ("HALS"), and other additives as well known by those skilled in the art to protect against degradation caused by UV light.

In some embodiments, Absorbers can comprise a type of light stabilizer that can function by competing with the chromophores to absorb UV radiation. Absorbers change harmful UV radiation into harmless infrared radiation, or heat that is dissipated through the polymer matrix. Carbon black is one of the most effective and commonly used light absorbers. Another UV absorber is rutile titanium oxide, which can be effective in the 315-400 nm range. Hydroxybenzophenone and hydroxyphenylbenzotriazole are also well-known UV stabilizers that can have the advantage of being suitable for neutral or transparent applications. Other UV absorbers can include oxanilides for polyamides, benzophenones for PVC and benzotriazoles and hydroxyphenyltriazines for polycarbonate. UV absorbers can have the benefit of low cost but may be useful only for short-term exposure.

In some embodiments, Quenchers can Quenchers return excited states of the chromophores to ground states by an energy transfer process. The energy transfer agent can function by quenching the excited state of a carbonyl group formed during the photo-oxidation of a plastic material, and through the decomposition of hydroperoxides. This can prevent bond cleavage and ultimately the formation of free radicals.

In some embodiments, HALS can comprise long-term thermal stabilizers that can act by trapping free radicals formed during the photo-oxidation of a plastic material and, thus, limiting the photodegradation process. The ability of Hindered Amine Light Stabilizers to scavenge radicals created by UV absorption can be explained by the formation of nitroxly radicals through a process known as the Denisov Cycle. Although there are wide structural differences in the HALS products commercially available, all share the 2,2,6,6-tetramethylpiperidine ring structure. HALS are some of the most proficient UV stabilizers for a wide range of plastics. For example, HALS has enabled the growth of polypropylene in the automotive industry. While HALS are also very effective in polyolefins, polyethylene and polyurethane they are not useful in PVC.

As all three of UV Absorbers, Quenchers and HALS function by different mechanisms, they can be combined into synergistic UV absorbing additives. For example, benzotriazoles can be combined with HALS to protect pigmented systems from fading and color changes.

STN also has a tensile strength of 8000 Mpa, making inserts 10 comprised of STN extremely durable for in the field use. Table 1 below sets out physical characteristics of STN.

TABLE 1

| | Properties | Condition | Value | | Test Method | Comment |
|---|---|---|---|---|---|---|
| | Modulus of elasticity (tensile test) | @ 73° F. | 245,000 | psi | ASTM D 638 | |
| | Wear (K) factor | Against Steel, 40 psi, 50 fpm | $200*10^{-10}$ | $in^3$-min/ft-lbs-hr | ASTM D 3702 | |
| Mechanical | Tensile strength at yield | @ 73° F. | 7,200 | psi | ASTM D 638 | |
| | Elongation at break | @ 73° F. | 60 | % | ASTM D 638 | |
| | Modulus of elasticity (flexural test) | @ 73° F. | 230,000 | psi | ASTM D 790 | |
| | Impact strength (Izod) | @ 73° F. | 17.0 | ft-lbs/in | ASTM D 256 | |
| | Rockwell hardness | R scale | 112 | | ASTM D 785 | |
| | Coefficient of friction | Dynamic, 40 psi, 50 fpm | 0.28 | | ASTM D 3702 | |
| | Melting temperature | | 505 | ° F. | ASTM D 2133 | |
| | Deflection temperature | @ 66 psi | 270 | ° F. | ASTM D 648 | |
| Thermal | Deflection temperature | @ 264 psi | 147 | ° F. | ASTM D 648 | |
| | Thermal expansion (CLTE) | | $6.7*10^{-4}$ | in/in/° F. | ASTM D 696 | |
| | Moisture absorption | @ 24 hrs, 73° F. | 1.2 | % | ASTM D 570 | |
| Other | Moisture absorption | @ saturation, 73° F. | 6.7 | % | ASTM D 570 | |
| | Flammability (UL94) | | HB | | 1) | 1) 0.81 mm |

These inserts will more than likely be placed in bags for shipping from job site to job site, which means they will be put through a bit of abuse at times. Having a durable material for inserts 10 to be made from STN can provide a safe, reliable product for all rigging operatives and technicians.

Although a few embodiments have been shown and described, it will be appreciated by those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof, it being recognized that the invention is defined and limited only by the claims that follow.

We claim:

1. An insert for guiding rigging ropes through a grating comprising spaced-apart cross-bar members operatively coupled to spaced-apart load bar members of a predetermined height, the insert comprising:
 a) a base member comprising a top surface;
 b) at least one rope guide extending downwardly from the top surface a first distance greater than the predetermined height, the at least one rope guide comprising a width "w" that fits between a pair of the spaced-apart load bar members spaced a second distance "A" therebetween; and
 c) wherein the base member comprises a perimeter further comprising at least one rounded shoulder that extends perpendicularly from the at least one rope guide a third distance greater than "A".

2. The insert as set forth in claim 1, wherein the at least one rope guide comprises a rounded inlet.

3. The insert as set forth in claim 1, wherein the at least one rope guide comprises an elongated configuration.

4. The insert as set forth in claim 1, wherein the width "w" of the at least one rope guide is selected such that at least some force is required to insert the at least one rope guide between adjacent load-bar members.

5. The insert as set forth in claim 1, further comprising at least two rope guides.

6. The insert as set forth in claim 1, wherein the insert is comprised of nylon.

7. The insert as set forth in claim 6, wherein the nylon comprises an additive to protect the insert from ultraviolet light.

8. A method for rigging a rope through a grating comprising spaced-apart cross-bar members operatively coupled to spaced-apart load bar members of a predetermined height, the method comprising the steps of:
 a) providing an insert for use on the grating, the insert comprising:
  i) a base member comprising a top surface,
  ii) at least one rope guide extending downwardly from the top surface a first distance greater than the predetermined height, the at least one rope guide comprising a width "w" that fits between a pair of the spaced-apart load bar members spaced a second distance "A" therebetween, and
  iii) wherein the base member comprises a perimeter further comprising at least one rounded shoulder that extends perpendicularly from the at least one rope guide a third distance greater than "A";
 b) placing the at least one rope guide between a pair of the spaced-apart load bar members; and
 c) passing at least one rigging rope through the at least one rope guide.

9. The method as set forth in claim 8, wherein the at least one rope guide comprises a rounded inlet.

10. The method as set forth in claim 8, wherein the at least one rope guide comprises an elongated configuration.

11. The method as set forth in claim 8, wherein the width "w" of the at least one rope guide is selected such that at least some force is required to insert the at least one rope guide between adjacent load-bar members.

12. The method as set forth in claim 8, wherein the insert comprises at least (Original) two rope guides.

13. The method as set forth in claim 8, wherein the insert is comprised of nylon.

14. The method as set forth in claim 13, wherein the nylon comprises an additive to protect the insert from ultraviolet light.

* * * * *